United States Patent [19]

Fujino et al.

[11] Patent Number: 4,510,414

[45] Date of Patent: Apr. 9, 1985

[54] ELECTRON EXCITED FLUORESCENT DISPLAY DEVICE INCLUDING SCREEN WITH RARE EARTH PHOSPHOR EXHIBITING SUBLINEAR CURRENT DENSITY-EMISSION LUMINANCE CHARACTERISTICS

[75] Inventors: Sigeo Fujino, Hiratsuka; Takashi Hase, Ebina; Akio Toshinai, Kanagawa, all of Japan

[73] Assignee: Fuji Photo Film Co., Ltd., Japan

[21] Appl. No.: 474,600

[22] PCT Filed: Jul. 23, 1982

[86] PCT No.: PCT/JP82/00286

§ 371 Date: Mar. 9, 1983

§ 102(e) Date: Mar. 9, 1983

[87] PCT Pub. No.: WO83/00342

PCT Pub. Date: Feb. 3, 1983

[30] Foreign Application Priority Data

Jul. 23, 1981 [JP] Japan .................. 56-115663
Aug. 13, 1981 [JP] Japan .................. 56-127104

[51] Int. Cl.³ .................. H01J 29/20; H01J 29/26; C09K 11/08
[52] U.S. Cl. .................. 313/468; 313/473; 252/301.4 S
[58] Field of Search .................. 313/468, 473; 252/301.4 S

[56] References Cited

U.S. PATENT DOCUMENTS 3,574,130 4/1971 Mathers et al. .............. 252/301.4 S

FOREIGN PATENT DOCUMENTS 33154 8/1976 Japan .

Primary Examiner—Palmer Demeo
Attorney, Agent, or Firm—Gerald J. Ferguson, Jr.; Joseph J. Baker

[57] ABSTRACT

A rear earth yellow to red emitting phosphor exhibiting the sublinear characteristics when the current density of an excitation electron beam is increased. The phosphor is represented by the general formula:

$$(Ln_{1-x-y},Eu_x,Ce_y)_2O_2S$$

in which Ln is at least one of yttrium, gadolinium, lanthanum and lutetium, x is a number satisfying $10^{-4} \leq x \leq 9 \times 10^{-2}$, preferably $10^{-2} \leq x \leq 8 \times 10^{-2}$, and y is a number satisfying $10^{-6} \leq y \leq 2 \times 10^{-3}$, preferably $2 \times 10^{-6} \leq y \leq 10^{-3}$. It exhibits a wide reproduced color range, and free of color drift at a high current. The phosphor is suitable for use in a multi-color cathode ray tube and a multi-color low-velocity electron excited fluorescent display device, and makes it possible to realize a high-performance electronic display unit.

9 Claims, 7 Drawing Figures

ELECTRON EXCITED FLUORESCENT DISPLAY DEVICE INCLUDING SCREEN WITH RARE EARTH PHOSPHOR EXHIBITING SUBLINEAR CURRENT DENSITY-EMISSION LUMINANCE CHARACTERISTICS

TECHNICAL FIELD

This invention relates to a rare earth phosphor exhibiting sublinear current density-emission luminance characteristics, and an electron excited fluorescent display device using the phosphor.

More particularly, this invention relates to an europium and cerium activated rare earth oxysulfide phosphor which emits yellow to red light and which exhibits sublinear current density-emission luminance characteristics by the addition of predetermined amounts of activators, and an electron excited fluorescent display device provided with a fluorescent screen comprising the phosphor as the main part thereof.

BACKGROUND ART

Recently, electron excited fluorescent display devices such as cathode ray tubes and low-velocity electron excited fluorescent display devices are used for various purposes, and need exists for phosphors exhibiting linear, sublinear or superlinear excitation energy-emission luminance characteristics over wide range of the excitation energy.

The electron excited fluorescent display devices of this type include cathode ray tubes such as a multi-color cathode ray tube, a projection cathode ray tube and a high-luminance color cathode ray tube, multi-color low-velocity electron excited fluorescent display devices, and the like. These electron excited fluorescent display devices are provided with fluorescent screens comprising several kinds of phosphors mixed or combined together, and required to exhibit light emission characteristics corresponding to the characteristics of the phosphors. Particularly, strong need exists for a red emitting phosphor exhibiting sublinear excitation energy-emission luminance characteristics. For example, a multi-color cathode ray tube recently employed in terminal display units of a computer system, display units of an aircraft control system, and the like comprises a fluorescent screen constituted by two kinds of phosphors emitting light of colors different from each other; i.e. a phosphor exhibiting superlinear excitation energy-emission luminance characteristics when energy of excitation electron beam increases, and a phosphor exhibiting sublinear excitation energy-emission luminance characteristics when energy of the excitation electron beam increases. In the multi-color cathode ray tube, the color of light emitted from the fluorescent screen is changed by changing the energy of the excitation electron beam, thereby multi-color display is effected.

The aforesaid multi-color cathode ray tube is classified into two types according to the methods of changing the energy of the excitation electron beam. In one type thereof, the energy of the excitation electron beam is changed by changing the acceleration potential. In the other type, the energy of the excitation electron beam is changed by changing the current density. The former type is called potential modulation type multi-color cathode ray tube, and the latter type is called current modulation type multi-color cathode ray tube. The potential modulation type multi-color cathode ray tube is described, for example, in "Nikkei Electronics", July 2, 1973, pages 106 to 117, and the current modulation type multi-color cathode ray tube is described in Japanese Patent Publication No. 52(1977)-5225.

The current modulation type multi-color cathode ray tube is advantageous over the potential modulation type multi-color cathode ray tube in that the constructions of the electron gun and the electron gun control circuit, and the like are markedly simple. In spite of this advantage, the current modulation type multi-color cathode ray tube is not so widely employed for practical use as the potential modulation type multi-color cathode ray tube. This is because there are known few phosphors suitable for use in the current modulation type multi-color cathode ray tube, i.e. the phosphors exhibiting sufficiently superlinear or sublinear current density-emission luminance characteristics when the current density of the excitation electron beam increases.

As the phosphors exhibiting superlinear current density-emission luminance characteristics (hereinafter referred to as superlinear characteristics) when the current density of the excitation electron beam increases, there have heretofore been known a copper and aluminium activated zinc sulfide green emitting phosphor (ZnS:Cu,Al) containing at least one metal selected from the group consisting of iron, cobalt and nickel in an appropriate amount, and a silver activated zinc cadmium sulfide green-blue to red emitting phosphor [(Zn,Cd)S:Ag] containing at least one metal selected from the group consising of iron, cobalt and nickel in an appropriate amount (as is well known, this phosphor emits green-blue to red light according to a change in the molar ratio of ZnS to CdS). Further, as the phosphor exhibiting sublinear current density-emission luminance characteristics (hereinafter referred to as sublinear characteristics) when the current density of the excitation electron beam increases, there is known a manganese activated zinc silicate green emitting phosphor ($Zn_2SiO_4$:Mn).

In general, in order to widen the range of color displayed on a multi-color cathode ray tube, the fluorescent screen is constituted by:

(i) a combination of a red emitting phosphor exhibiting superlinear excitation energy-emission luminance characteristics with a green emitting phosphor exhibiting sublinear excitation energy-emission luminance characteristics, or (ii) a combination of a green-blue to green emitting phosphor exhibiting superlinear excitation energy-emission luminance characteristics with a red emitting phosphor exhibiting sublinear excitation energy-emission luminance characteristics. In view of the above, it is contemplated to constitute the fluorescent screen of a current modulation multi-color cathode ray tube by use of a combination of the aforesaid (Zn,Cd)S:Ag red emitting phosphor containing at least one metal selected from the group of iron, cobalt and nickel (exhibiting the superlinear characteristics) with the aforesaid $Zn_2SiO_4$:Mn green emitting phosphor (exhibiting the sublinear characteristics). On the other hand, however, there has not heretofore been known any red emitting phosphor exhibiting good sublinear characteristics suitable for use in combination with the aforesaid ZnS:Cu,Al green emitting phosphor containing at least one metal selected from the group consisting of iron, cobalt and nickel or with the aforesaid (Zn,Cd)S:Ag green-blue to green emitting phosphor containing at least one metal selected from the group consisting of iron, cobalt and nickel (both phosphors exhibit the superlinear characteristics).

Also in electron excited fluorescent display devices other than the above-described current modulation type multi-color cathode ray tube, since there is not known any yellow to red emitting phosphor exhibiting good sublinear characteristics matching the current saturation characteristics of another phosphor employed together, very real problems such as color drift occurring at a high current arise.

Accordingly, there has been strong need for a yellow to red emitting phosphor exhibiting the sublinear characteristics, and a multi-color cathode ray tube and a multi-color low-velocity electron excited fluorescent display device exhibiting a wide reproduced color range, or a high luminance color cathode ray tube free of color drift at a high current.

The primary object of the present invention is to provide a yellow to red emitting phosphor exhibiting good sublinear characteristics.

Another object of the present invention is to provide an electron excited fluorescent display device having a wide reproduced color range by use of the yellow to red emitting phosphor exhibiting good sublinear characteristics.

The specific object of the present invention is to provide an electron excited fluorescent display device free of color drift at a high current by virtue of the use of the yellow to red emitting phosphor exhibiting good sublinear characteristics.

It is already known that an europium activated rare earth oxysulfide phosphor represented by the general formula:

$$(Ln,Eu)_2O_2S$$

in which Ln is at least one of yttrium, gadolinium, lanthanum and lutetium, emits yellow to red light of high luminance under electron excitation according to the level of the Eu activator amount contained in the phosphor. For example, a $Y_2O_2S:Eu$ phosphor which is one of the phosphors of this type and contains a relatively large amount of the Eu activator is presently employed in the practical use as a red emitting component phosphor of a color television cathode ray tube.

It is known that, as shown in FIG. 1, the $(Ln,Eu)_2O_2S$ phosphor exhibits very slight sublinear characteristics. In view of the ability of the $(Ln,Eu)_2O_2S$ phosphor to emit light of high luminance on the practical use level, the inventors of the present invention carried out various investigations to improve sublinearity exhibited by the $(Ln,Eu)_2O_2S$ phosphor for the purpose of accomplishing the aforesaid objects of the present invention. As a result of the investigations, it was found that, when cerium (Ce) serving as a coactivator employed together with Eu is used in an amount within a predetermined range, it is possible to improve sublinearity of the current density-emission luminance relationship (hereinafter referred to as sublinearity) exhibited by the $(Ln,Eu)_2O_2S$ phosphor. Further, it was found that the aforesaid sublinearity is markedly improved when the amount of the Ce coactivator is within a particularly defined range falling within the aforesaid predetermined range. Based on these findings, the present invention has been completed.

DISCLOSURE OF INVENTION

The phosphor exhibiting the sublinear characteristics in accordance with the present invention is an europium and cerium activated rare earth oxysulfide phosphor represented by the general formula:

$$(Ln_{1-x-y}Eu_x,Ce_y)_2O_2S$$

in which Ln is at least one of yttrium, gadolinium, lanthanum and lutetium, x is a number satisfying $10^{-4} \leq x \leq 9 \times 10^{-2}$, and y is a number satisfying $10^{-6} \leq y \leq 2 \times 10^{-3}$. The phosphor in accordance with the present invention exhibits better sublinearity than sublinearity of the $(Ln,Eu)_2O_2S$ phosphor when the current density of the excitation electron beam increases. Particularly, the phosphor represented by the above-described general formula in which y (Ce coactivator amount) is within the range of $2 \times 10^{-6} \leq y \leq 10^{-3}$ exhibits markedly improved sublinearity.

Further, the electron excited fluorescent display device in accordance with the present invention comprises the aforesaid yellow to red emitting phosphor exhibiting the sublinear characteristics in accordance with the present invention as the main part of the fluorescent screen.

In Japanese Patent Publication Nos. 47(1972)-3321 and 47(1972)-3322, lanthanide element activated rare earth oxysulfide phosphors represented by the general formula:

$$M'_{(2-x)}M''_xO_2S$$

in which M' is yttrium, gadolinium or lanthanum, M'' is at least one lanthanide element, and x is a number satisfying $0.0002 < x < 0.2$, are disclosed. Some of the phosphors in accordance with the present invention will be embraced in these lanthanide element activated rare earth oxysulfide phosphors. However, the aforesaid publications are silent on a phosphor containing Eu as an activator and Ce as a coactivator. Further, these publications do not suggest that a phosphor containing Eu and Ce as the activator and coactivator, respectively, in amounts within the specific ranges would exhibit good sublinear characteristics, and that such a phosphor would be useful for the aforesaid purposes.

The phosphor in accordance with the present invention can be prepared as described below.

As raw materials for the phosphor, the following are used:

(i) at least one compound selected from the compound group comprising the first compound group consisting of yttrium oxide ($Y_2O_3$), gadolinium oxide ($Gd_2O_3$), lanthanum oxide ($La_2O_3$) and lutetium oxide ($Lu_2O_3$), and the second compound group consisting of a yttrium compound, a gadolinium compound, a lanthanum compound and a lutetium compound capable of being easily converted to $Y_2O_3$, $Gd_2O_3$, $La_2O_3$ and $Lu_2O_3$ respectively at high temperatures, such as nitrate, sulfate, carbonate, oxalate, or hydroxide, (ii) at least one compound selected from the group consisting of europium oxide ($Eu_2O_3$), and an europium compound capable of being easily converted to $Eu_2O_3$ at high temperatures, such as nitrate, sulfate, carbonate, oxalate, or hydroxide, (iii) at least one compound selected from the group consisting of cerium dioxide ($CeO_2$), and a cerium compound capable of being easily converted to $CeO_2$ at high temperatures, such as nitrate, sulfate, carbonate, oxalate, or hydroxide, (iv) sulfur (S), and (v) a flux generally employed in the preparation of an oxysulfide phosphor, for example, an alkali metal salt such as sodium carbonate ($Na_2CO_3$) or potassium phosphate ($K_3PO_4$), or the like.

The constituents (i) and (iv) are the matrix raw materials, the constituent (ii) is the Eu activator raw material, and the constituent (iii) is the Ce coactivator raw material. The constituents (i), (ii) and (iii) are used in such a stoichiometric ratio that a mixed oxide represented by the general formula:

$$(Ln_{1-x-y}, Eu_x, Ce_y)_2O_2S$$

in which Ln is at least one of yttrium, gadolinium, lanthanum and lutetium, x is a number satisfying $10^{-4} \leq x \leq 9 \times 10^{-2}$, and y is a number satisfying $10^{-6} \leq y \leq 2 \times 10^{-3}$, is obtained. The constituent (iv) is used in an amount within the range of 30 wt. % to 60 wt. % based on the aforesaid mixed oxide. The constituent (v) is used in an amount within the range of 5 wt. % to 50 wt. % based on the aforesaid mixed oxide. The necessary amounts of the phosphor raw materials are weighed, and intimately mixed to obtain a phosphor raw material mixture.

Then, the obtained phosphor raw material mixture is charged into a heat-resistant vessel such as alumina crucible or quartz crucible, and fired. The firing is conducted in air at a temperature within the range of 900° to 1,500° C. The firing time is generally within the range of 0.5 hour to 5 hours, depending on the amount of the phosphor raw material mixture charged into the heat-resistant vessel, the firing temperature, and the like. After the firing, the fired product is washed and dried to obtain the phosphor in accordance with the present invention.

The phosphor in accordance with the present invention exhibits sublinear characteristics when the current density of the excitation electron beam increases. The sublinearity which the phosphor in accordance with the present invention exhibits is higher than the sublinearity exhibited by the $(Ln,Eu)_2O_2S$ phosphor containing the same Eu activator amount.

FIG. 2 is a graph showing the current density-emission luminance relationship exhibited by the $(Y_{0.94999}, Eu_{0.05}, Ce_{0.00001})_2O_2S$ phosphor in accordance with the present invention. In FIG. 2, the ordinate indicates the specific luminance of emission with respect to the luminance of emission of the $(Y_{0.95}, Eu_{0.05})_2O_2S$ phosphor at each current density value, which is taken as 100%.

From FIG. 2, it will be understood that, unlike the $(Y_{0.95}, Eu_{0.05})_2O_2S$ phosphor exhibiting very slight sublinear characteristics as shown in FIG. 1, the $(Y_{0.94999}, Eu_{0.05}, Ce_{0.00001})_2O_2S$ phosphor exhibits the marked sublinear characteristics as shown in FIG. 2. Further, the sublinearity exhibited by the $(Y_{0.94999}, Eu_{0.05}, Ce_{0.00001})_2O_2S$ phosphor is extremely higher than the sublinearity exhibited by the $(Y_{0.95}, Eu_{0.05})_2O_2S$ phosphor containing the same Eu activator amount.

The sublinearity exhibited by the phosphor in accordance with the present invention is a function of the Ce activator amount (value y). For example, if the luminance of emission of the $(Y_{0.95-y}, Eu_{0.05}, Ce_y)_2O_2S$ phosphor when the current density of the excitation electron beam is 0.1 $\mu A/cm^2$ and 2.0 $\mu A/cm^2$ is $A_1$ and $B_1$ respectively, the sublinearity exhibited by this phosphor is expressed by $B_1/A_1$ (of course, the sublinearity is higher as the value $B_1/A_1$ is smaller). The sublinearity changes depending on the Ce coactivator amount.

FIG. 3 is a graph showing the relationship between the Ce coactivator amount contained in the $(Y_{0.95-y}, Eu_{0.05}, Ce_y)_2O_2S$ phosphor and the sublinearity exhibited by this phosphor. In FIG. 3, the sublinearity is indicated in terms of $B_1A_2/A_1B_2$ values on the ordinate. $A_2$ and $B_2$ are the luminance of emission of the $(Y_{0.95}, Eu_{0.05})_2O_2S$ phosphor containing the same Eu activator amount as in the $(Y_{0.95-y}, Eu_{0.05}, Ce_y)_2O_2S$ phosphor at the current density of 0.1 $\mu A/cm^2$ and 2.0 $\mu A/cm^2$, respectively.

A $B_1A_2/A_1B_2$ value smaller than 1 means that the sublinearity exhibited by the $(Y_{0.95-y}, Eu_{0.05}, Ce_y)_2O_2S$ phosphor is higher than the sublinearity exhibited by the $(Y_{0.95}, Eu_{0.05})_2O_2S$ phosphor. A $B_1A_2/A_1B_2$ value larger than 1 means reversely.

As is clear from FIG. 3, the sublinearity exhibited by the $(Y_{0.95-y}, Eu_{0.05}, Ce_y)_2O_2S$ phosphor changes depending on the Ce coactivator amount contained therein. Further, the sublinearity exhibited by the $(Y_{0.95-y}, Eu_{0.05}, Ce_y)_2O_2S$ phosphor becomes higher than the sublinearity exhibited by the $(Y_{0.95}, Eu_{0.05})_2O_2S$ phosphor when the value y, i.e. the Ce coactivator amount, is within the range of $10^{-6} \leq y \leq 2 \times 10^{-3}$. Based on this finding, the value y is defined within the range of $10^{-6} \leq y \leq 2 \times 10^{-3}$ in the present invention. Particularly, when the value y is within the range of $2 \times 10^{-6} \leq y \leq 10^{-3}$, the $(Y_{0.95-y}, Eu_{0.05}, Ce_y)_2O_2S$ phosphor exhibits markedly high sublinearity.

FIG. 4 is a graph showing the relationship between the Ce coactivator amount contained in the $(Y_{0.95-y}, Eu_{0.05}, Ce_y)_2O_2S$ phosphor and the luminance of emission of this phosphor. In FIG. 4, the luminance of emission is indicated on the ordinate in terms of the relative values with respect to the luminance of emission of the phosphor wherein y=0, i.e. the $(Y_{0.95}, Eu_{0.05})_2O_2S$ phosphor, which is taken as 100%. Further, the emission of luminance shown in FIG. 4 is the value when the current density of the excitation electron beam is 0.5 $\mu A/CM^2$.

As is clear from FIG. 4, the luminance of emission gradually decreases as the Ce coactivator amount is increased. Namely, Ce has a negative effect on the luminance of emission of the phosphor in accordance with the present invention. However, the phosphor in accordance with the present invention wherein the Ce coactivator amount y is small maintains sufficiently high luminance of emission.

FIG. 2 to 4 show data on the phosphors in which rare earth element Ln constituting the matrix is Y. Also for the phosphor in which Ln is Gd, La or Lu and the phosphors in which Ln is two or more of Y, Gd, La and Lu, results similar to those shown in FIGS. 2 to 4 have been obtained.

In the present invention, from the viewpoint of the luminance of emission or the like, the Eu activator amount (value x) is defined within the range of $10^{-4} \leq x \leq 9 \times 10^{-2}$. The phosphor wherein the value x is within the aforesaid range exhibits emission of yellow to red light according to the level of the value x. Particularly, the phosphor wherein the value x is within the range of $10^{-2} \leq x \leq 8 \times 10^{-2}$ exhibits emission of red light of good color purity. Eu scarcely affects the sublinearity exhibited by the phosphor. Further, Ce scarcely affects the emission spectrum (emission color) of the phosphor. Namely, the emission spectrum of the phosphor in accordance with the present invention is almost the same as the emission spectrum of the $(Ln,Eu)_2O_2S$ phosphor containing the same Eu activator amount as in the phosphor in accordance with the present invention.

The electron excited fluorescent display tube in accordance with the present invention comprises the aforesaid yellow to red emitting phosphor exhibiting the sublinear characteristics in accordance with the present invention as the main part of the fluorescent screen.

The electron excited fluorescent display tube in accordance with the present invention embraces, for example, a current modulation type multi-color cathode ray tube provided with a fluorescent screen comprising a combination of the phosphor in accordance with the present invention with a green emitting phosphor or a blue emitting phosphor exhibiting sublinear characteristics, a high luminance color cathode ray tube provided with a fluorescent screen comprising a combination of the phosphor in accordance with the present invention with a green emitting phosphor and a blue emitting phosphor exhibiting sublinear characteristics at a high current, a projection cathode ray tube comprising the phosphor in accordance with the present invention as the red emitting component, a high luminance black-and-white cathode ray tube provided with a fluorescent screen comprising a mixture of the phosphor in accordance with the present invention and a blue emitting phosphor and a yellow emitting phosphor exhibiting sublinear characteristics at a high current, a multi-color low-velocity electron excited fluorescent display tube provided with a fluorescent screen comprising a mixture of the phosphor in accordance with the present invention, a phosphor emitting light of another color and exhibiting linear or sublinear characteristics, and a conductive metal oxide (indium oxide, tin oxide or the like), or the like. As an example of the electron excited fluorescent display device in accordance with the present invention, the multi-color cathode ray tube is hereinbelow described in detail.

FIG. 5 is a schematic sectional view showing a typical embodiment of the current modulation type multi-color cathode ray tube for the purpose of explaining the construction thereof. As shown in FIG. 5, an electron gun 1 is positioned in a cylindrical section of a glass funnel 7 constituting a bulb together with a glass face plate 6. The electron gun 1 is the so-called current modulation electron gun having the function of changing the current density of an electron beam 2 emitted therefrom. A fluorescent screen 3 is positioned on the inner surface of the glass face plate 6 so as to stand face to face with the current modulation electron gun 1. Further, a pair of deflecting coils 4 and 4' are positioned between the current modulation electron gun 1 and the fluorescent screen 3, i.e. at the neck portion of the glass funnel 7. A pair of the deflecting coils 4 and 4' generate a magnetic field at right angles to the advancing direction of the electron beam 2 in order to deflect the electron beam 2. The entire surface of the fluorescent screen 3 is excited by the electron beam 2 emitted from the current modulation electron gun 1 and deflected by the deflecting coils 4 and 4', and caused to emit light therefrom.

As described above, the fluorescent screen 3 is a non-pattern fluorescent screen comprising two kinds of phosphors capable of emitting light of colors different from each other; i.e. a phosphor exhibiting superlinear characteristics or linear characteristics when the current density of the electron beam 2 is increased, and a phosphor exhibiting sublinear or linear characteristics when the current density of the electron beam 2 is increased (however, the two kinds of phosphors do not exhibit the linear characteristics at the same time). The non-pattern fluorescent screen 3 may have a dual layer construction in which the two kinds of phosphors constitute independent layers, or may be of a single layer formed by a mixture of the two kinds of phosphors (in FIG. 5, the non-pattern fluorescent screen 3 is shown as a single layer screen). Since the non-pattern fluorescent screen 3 comprises two kinds of phosphors as described above, the color of light emitted from the non-pattern fluorescent screen 3 upon excitation with the electron beam 2 changes according to a change in the current density of the electron beam 2. Accordingly, by changing the current density of the electron beam 2, it is possible to make the displayed image observed through the glass face plate 6 be chanced to a multi-colored image having colors changed according to the change in the current density of the electron beam 2.

On the rear surface of the non-pattern fluorescent screen 3 (i.e. the surface thereof opposite to the glass face plate 6 and nearer to the electron gun 1) is positioned a thin film (backing metal film) 5 made of a metal such as aluminium. The thin metal film 5 is positioned for the purpose of, for example, increasing the luminance of the displayed multi-color image observed through the glass face plate 6 by reflecting the light emitted inwardly of the cathode ray tube from the fluorescent screen 3, and is not essential to the current modulation type multi-color cathode ray tube.

In general, the current modulation type multi-color cathode ray tube is provided with a single current modulation electron gun as shown in FIG. 5. There is also known a current modulation type multi-color cathode ray tube provided with a plurality of current modulation electron guns.

As mentioned above, the current modulation type multi-color cathode ray tube having the construction as explained above with reference to FIG. 5 is advantageous over the potential modulation type multi-color cathode ray tube in that the circuit is greatly simpler.

The phosphor constituting the fluorescent screen of the current modulation type multi-color cathode ray tube together with the phosphor exhibiting the sublinear characteristics and consisting of the $(Ln_{1-x-y},Eu_x,Ce_y)_2O_2S$ phosphor may be any phosphor insofar as the phosphor emits light of color different from the color of emission of the aforesaid phosphor exhibiting the sublinear characteristics, and exhibits superlinear or linear characteristics when the current density of the excitation electron beam is increased. However, since the $(Ln_{1-x-y},Eu_x,Ce_y)_2O_2S$ phosphor emits yellow to red light, it is preferable that the phosphor exhibiting the superlinear or linear characteristics, which is employed in combination with the phosphor exhibiting the sublinear current density-emission luminance relationship and consisting of the $(Ln_{1-x-y},Eu_x,Ce_y)_2O_2S$ phosphor, is a phosphor showing blue to green emission. As the phosphor of such a type and exhibiting the superlinear characteristics, for example, a silver activated zinc cadmium sulfide green-blue to green emitting phosphor [(Zn,Cd)S:Ag] containing at least one metal selected from the group consisting of iron, cobalt, nickel and vanadium in an appropriate amount (the emission color of this phosphor changes according to a change in the molar ratio of ZnS to CdS), a copper and aluminium activated zinc sulfide green emitting phosphor (ZnS:Cu,Al) containing at least one metal selected from the group consisting of iron, cobalt, nickel and vanadium in an appropriate amount, and the like are preferable. As the phosphors of the aforesaid type and exhibiting the linear characteristics, for example, a silver activated zinc cadmium sulfide blue-green to green emitting phosphor (Zn,Cd)S:Ag, a copper and aluminium activated zinc sulfide green emitting phosphor (ZnS:Cu,Al), a copper and aluminium activated zinc cadmium sulfide green emitting phosphor [(Zn,Cd)S:Cu,Al], a terbium activated rare earth sulfide green emitting phosphor [$(Ln,Tb)_2O_2S$, in which Ln is at least one of yttrium, gadolinium, lanthanum and lutetium], a silver activated zinc sulfide blue emitting phosphor (ZnS:Ag), a cerium activated yttrium silicate blue emitting phosphor ($Y_2SiO_5$:Ce), and the like are preferable. Among the above enumerated phosphors, the (Zn,Cd)S:Ag blue-green to green emitting phosphor containing at least one metal selected from the group consisting of iron, cobalt and nickel in an appropriate amount, and the ZnS:Cu,Al green emitting phosphor containing at least one metal selected from the group consisting of iron, cobalt and nickel in an appropriate amount (both phosphors exhibit superlinear characteristics) are particularly preferable.

The fluorescent screen (non-pattern fluorescent screen) of the current modulation type multi-color cathode ray tube in accordance with the present invention may have a dual layer construction in which the two kinds of phosphors, i.e. the phosphor exhibiting the sublinear characteristics and consisting of the $(Ln_{1-x-y},Eu_x,Ce_y)_2O_2S$ phosphor, and the phosphor exhibiting the superlinear or linear characteristics and emitting light of color different from that of the aforesaid phosphor exhibiting the sublinear characteristics. Alternatively, the fluorescent screen may be of a single layer formed by a phosphor mixture containing the aforesaid two kinds of phosphors mixed in an appropriate ratio. In the former case, it is preferable that the layer nearer to the electron gun is composed of the phosphor exhibiting the sublinear characteristics and consisting of the $(Ln_{1-x-y},Eu_x,Ce_y)_2O_2S$ phosphor. In the latter case, it is preferable that the aforesaid phosphor mixture comprises grains of the phosphor exhibiting the sublinear characteristics and consisting of the $(Ln_{1-x-y},Eu_x,Ce_y)_2O_2S$ phosphor, which are sticked to the surfaces of the grains of the phosphor exhibiting the superlinear or linear characteristics. The fluorescent screen of the current modulation type multi-color cathode ray tube in accordance with the present invention may be made by the conventional fluorescent screen making methods such as sedimentation coating and rotation coating. Further, as already mentioned above, a thin film made of a metal such as aluminium is generally positioned on the rear surface of the fluorescent screen (the surface thereof nearer to the electron gun). The thin metal film may be formed by the conventional thin metal film making method, for example, deposition and the like.

As described above, when the Eu activator amount is the same, the $(Ln_{1-x-y},Eu_x,Ce_y)_2O_2S$ phosphor manifests emission of the same color as the color of emission of the $(Ln,Eu)_2O_2S$ phosphor, and higher sublinear characteristics than the $(Ln,Eu)_2O_2S$ phosphor. Therefore, as will be shown in the examples below, the current modulation type multi-color cathode ray tube in accordance with the present invention, which is provided with the fluorescent screen comprising the $(Ln_{1-x-y},Eu_x,Ce_y)_2O_2S$ phosphor employed as the phosphor exhibiting the sublinear characteristics, manifests a wider displayed color range than the current modulation type multi-color cathode ray tube provided with the fluorescent screen made by the same specifications and under the same conditions as those in the fluorescent screen employed in the present invention, except that the $(Ln,Eu)_2O_2S$ phosphor having the same Eu activator amount as in the $(Ln_{1-x-y},Eu_x,Ce_y)_2O_2S$ phosphor is used, instead of this phosphor, as the phosphor exhibiting the sublinear characteristics.

BEST MODE OF CARRYING OUT THE INVENTION

The present invention is further illustrated by the following examples. Of course, the present invention shall not be limited to the following examples.

EXAMPLE 1

| Yttrium oxide | $Y_2O_3$ | 214.5 g |
| --- | --- | --- |
| Europium oxide | $Eu_2O_3$ | 17.6 g |
| Cerium dioxide | $CeO_2$ | 0.0034 g |
| Sulfur | S | 120 g |
| Sodium carbonate | $Na_2CO_3$ | 80 g |
| Potassium phosphate | $K_3PO_4.3H_2O$ | 20 g |

Figure 1:
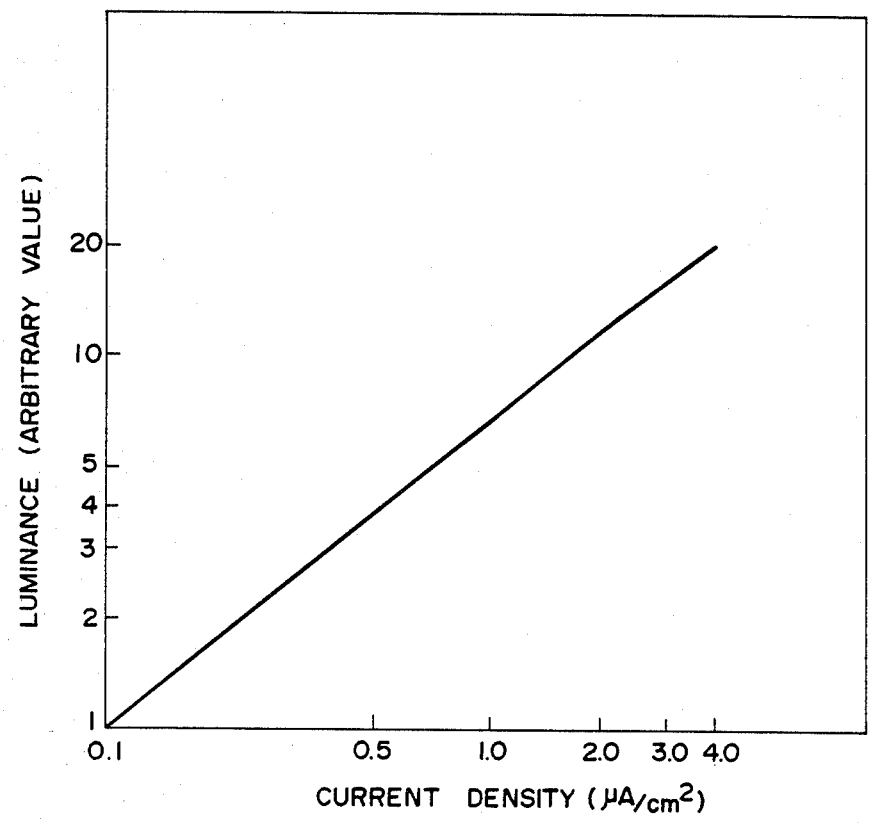
FIG. 1 is a graph showing the very slightly sublinear current density-emission luminance characteristics exhibited by the $(Ln,Eu)_2O_2S$ phosphor.
Figure 2:
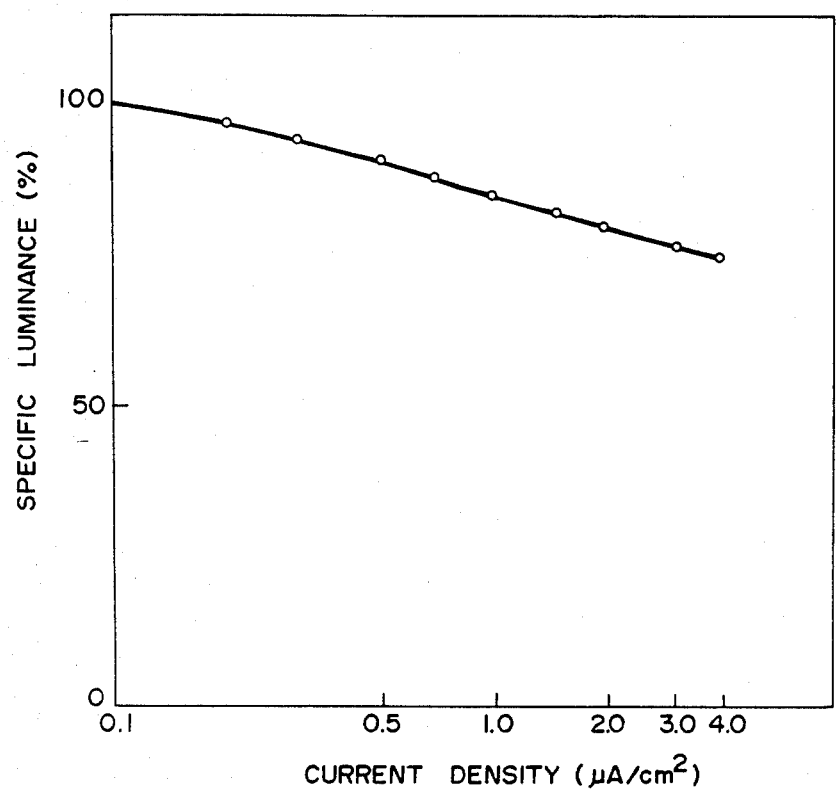
FIG. 2 is a graph showing the sublinear current density-emission luminance characteristics exhibited by the phosphor in accordance with the present invention.
Figure 3:
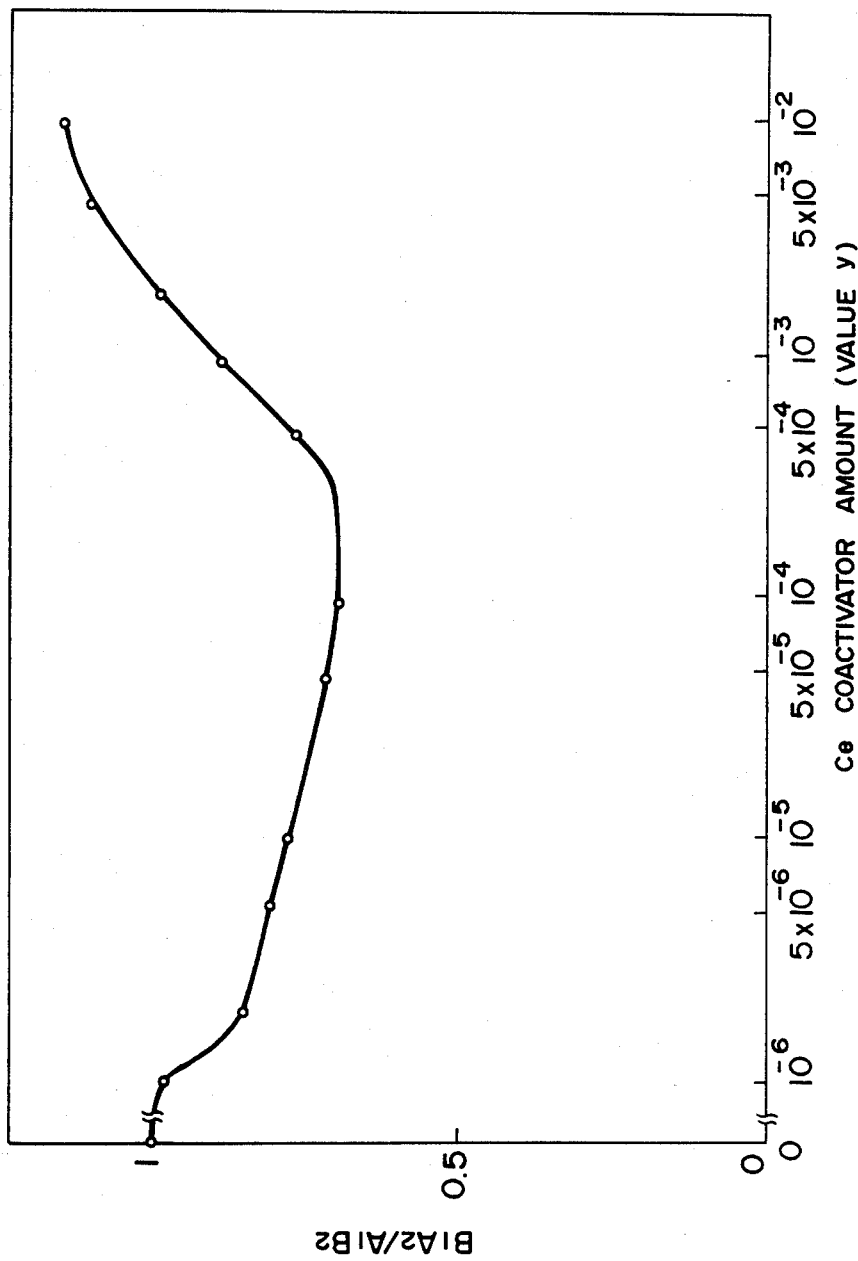
FIG. 3 is a graph showing the relationship between the Ce coactivator amount contained in the phosphor in accordance with the present invention and the sublinearity of the current density-emission luminance characteristics exhibited by the phosphor.
Figure 4:
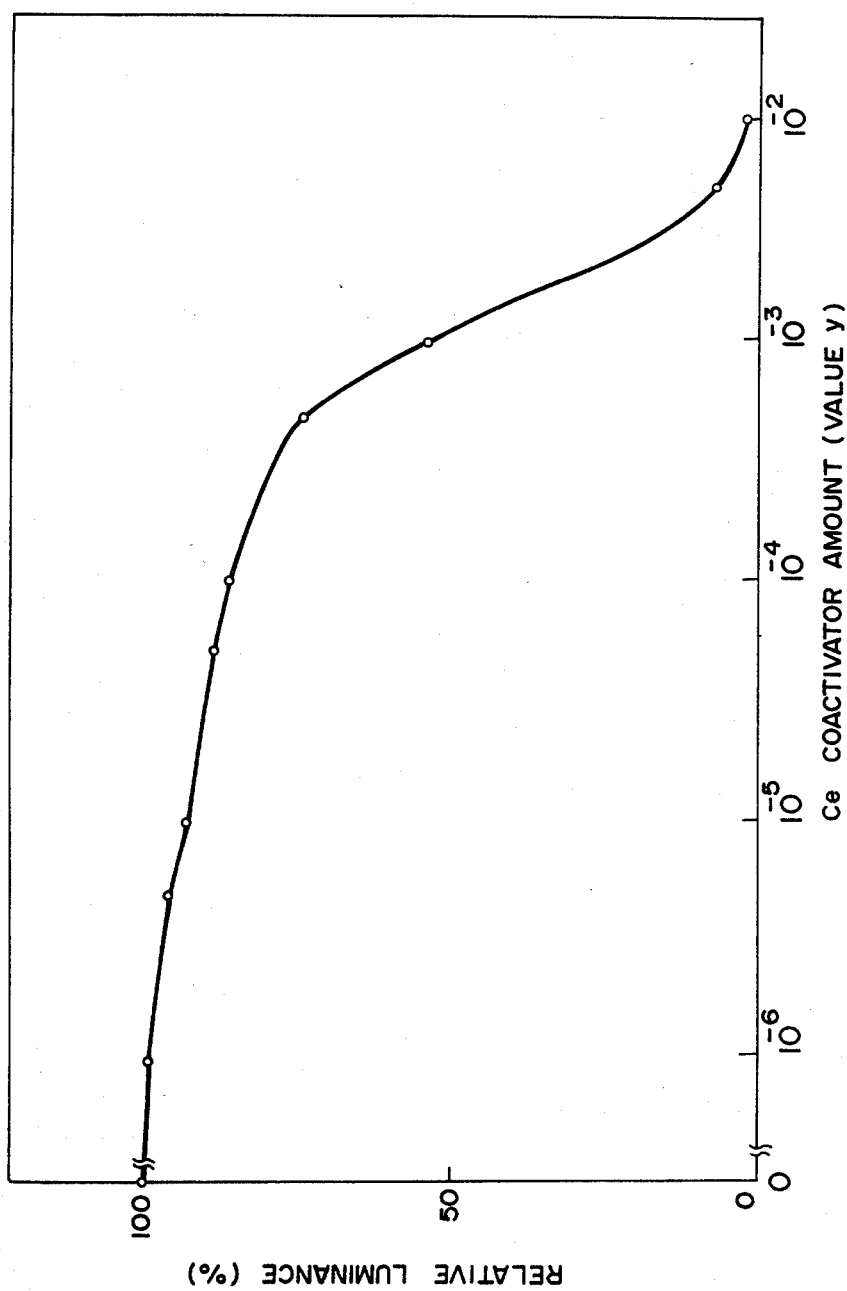
FIG. 4 is a graph showing the relationship between the Ce coactivator amount contained in the phosphor in accordance with the present invention and the luminance of emission of the phosphor.

The above phosphor raw materials were intimately mixed. The mixture obtained was charged into an alumina crucible, and fired in air at a temperature of 1,200° C. for two hours. After the firing, the firing product obtained was fully washed with water, and dried. In this way, a $(Y_{0.94999},Eu_{0.05},Ce_{0.00001})_2O_2S$ phosphor was obtained. This phosphor exhibited sublinear current density-emission luminance relationship when the current density of the excitation electron beam was increased. As shown in FIG. 3, the sublinearity of the current density-emission luminance relationship of the phosphor was higher than the sublinearity of a $(Y_{0.95},Eu_{0.05})_2O_2S$ phosphor.

EXAMPLE 2

| Yttrium oxide | $Y_2O_3$ | 219.0 g |
|---|---|---|
| Europium oxide | $Eu_2O_3$ | 10.6 g |
| Cerium nitrate | $Ce(NO_3)_3.6H_2O$ | 0.0087 g |
| Sulfur | S | 120 g |
| Sodium carbonate | $Na_2CO_3$ | 80 g |
| Potassium phosphate | $K_3PO_4.3H_2O$ | 20 g |

A $(Y_{0.96999},Eu_{0.03},Ce_{0.00001})_2O_2S$ phosphor was prepared by using the above phosphor raw materials in the same way as described in Example 1. This phosphor exhibited sublinear current density-emission luminance relationship when the current density of the excitation electron beam was increased. The sublinearity of the current density-emission luminance relationship of this phosphor was higher than the sublinearity of a $(Y_{0.97},Eu_{0.03})_2O_2S$ phosphor.

EXAMPLE 3

| Yttrium oxide | $Y_2O_3$ | 158.0 g |
|---|---|---|
| Gadolinium oxide | $Gd_2O_3$ | 79.8 g |
| Europium oxide | $Eu_2O_3$ | 28.2 g |
| Cerium dioxide | $CeO_2$ | 0.034 g |
| Sulfur | S | 120 g |
| Sodium carbonate | $Na_2CO_3$ | 80 g |
| Potassium phosphate | $K_3PO_4.3H_2O$ | 20 g |

A $(Y_{0.6999},Gd_{0.22},Eu_{0.08},Ce_{0.0001})_2O_2S$ phosphor was prepared by using the above phosphor raw materials in the same way as described in Example 1. This phosphor exhibited sublinear current density-emission luminance relationship when the current density of the excitation electron beam was increased. The sublinearity of the current density-emission luminance relationship of this phosphor was higher than the sublinearity of a $(Y_{0.7},Gd_{0.22},Eu_{0.08})_2O_2S$ phosphor.

EXAMPLE 4

Figure 5:
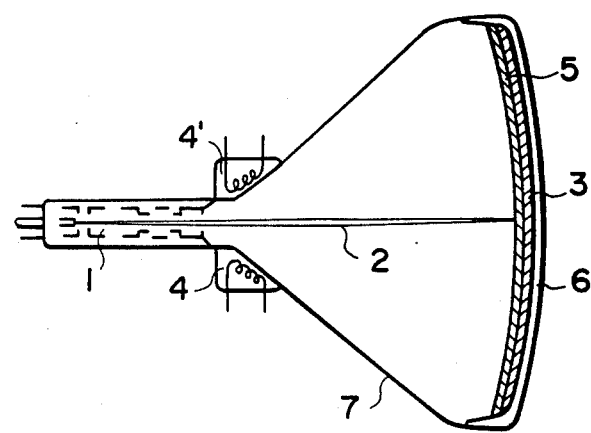
FIG. 5 is a schematic sectional view showing a typical embodiment of the current modulation type multi-color cathode ray tube.

A current modulation type multi-color cathode ray tube having the construction as shown in FIG. 5 and provided with a fluorescent screen comprising a phosphor mixture containing a $(Y_{0.94999},Eu_{0.05},Ce_{0.00001})_2O_2S$ red emitting phosphor and a (Zn,Cd)S:Ag green emitting phosphor containing a nickel (as described above, this phosphor exhibits the superlinear current density-emission luminance relationship) in a weight ratio of 3:2 was made according to the ordinary making method for current modulation type multi-color cathode ray tubes. The fluorescent screen was made by the sedimentation coating method.

Figure 6:
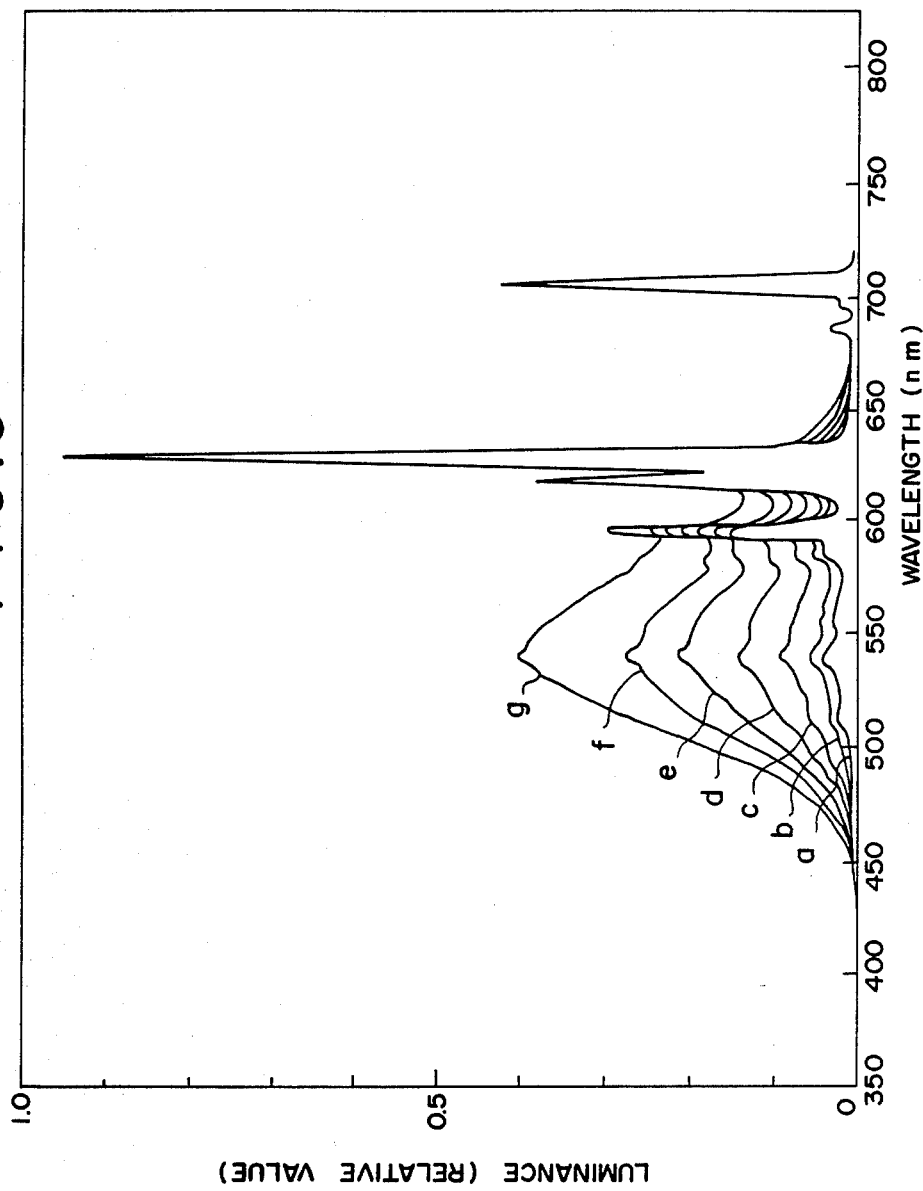
FIG. 6 is a graph showing a change in the emission spectrum of an embodiment of the multi-color cathode ray tube in accordance with the present invention as the current density of the electron beam is increased.

FIG. 6 is a graph showing a change in the emission spectrum of the thus obtained current modulation type multi-color cathode ray tube in accordance with the present invention as the current density of the electron beam was increased. Curves a, b, c, d, e, f and g indicate the emission spectra obtained when the current density was 0.1 $\mu A/cm^2$, 0.2 $\mu A/cm^2$, 0.5 $\mu A/cm^2$, 1.0 $\mu A/cm^2$, 2.0 $\mu A/cm^2$, 3.0 $\mu A/cm^2$ and 4.0 $\mu A/cm^2$ respectively (the acceleration potential for the electron beam was 25 kV in every case). In FIG. 6, the intensity of emission is indicated on the ordinate in terms of the relative values with respect to the intensity of emission at the main emission peak of the $(Y_{0.94999},Eu_{0.05},Ce_{0.00001})_2O_2S$ red emitting phosphor, which is taken as 1. As is clear from FIG. 6, the proportion of the intensity of emission of the (Zn,Cd)S:Ag green emitting phosphor containing nickel with respect to the intensity of emission of the $(Y_{0.94999},Eu_{0.05},Ce_{0.00001})_2O_2S$ red emitting phosphor increases as the current density of the electron beam is increased. Consequently, the emission color of the cathode ray tube changes as the current density of the electron beam is increased.

Figure 7:
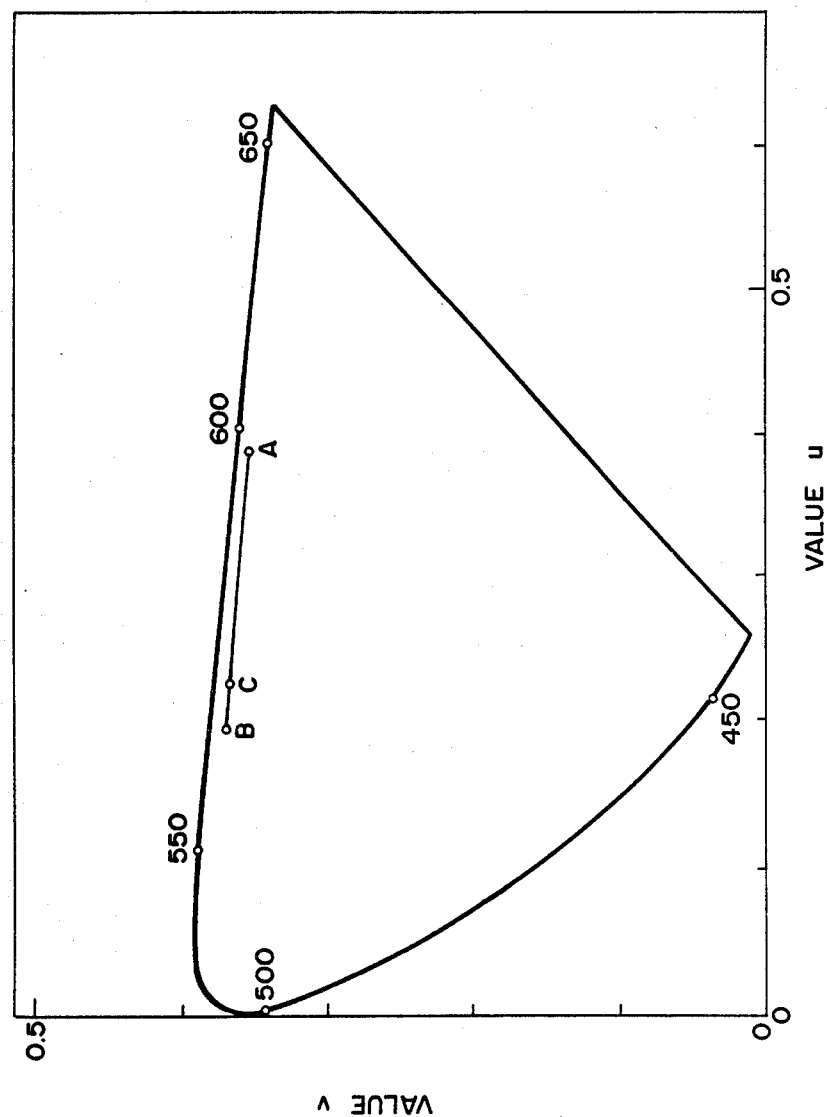
FIG. 7 is a graph showing a change in the emission color of an embodiment of the current modulation type multi-color cathode ray tube in accordance with the present invention as the current density of the electron beam is increased, on the UCS chromaticity diagram, in comparison with the change in the emission color of a current modulation type multi-color cathode ray tube provided with a fluorescent screen comprising the $(Ln,Eu)_2O_2S$ phosphor employed as the phosphor exhibiting the sublinear current density-emission luminance characteristics.

FIG. 7 is a graph showing a change in the emission color of the above-described current modulation type multi-color cathode ray tube in accordance with the present invention as the current density of the electron beam is increased, on the UCS chromaticity diagram. In FIG. 7, a chromaticity point A (u=0.3891, v=0.3568) indicates the emission color of the cathode ray tube when the current density of the electron beam is 0.1 $\mu A/cm^2$ (the emission spectrum of the cathode ray tube is indicated by the curve a in FIG. 6), and a chromaticity point B (u=0.1950, v=0.3721) indicates the emission color of the cathode ray tube when the current density of the electron beam is 4.0 $\mu A/cm^2$ (the emission spectrum of the cathode ray tube is indicated by the curve g in FIG. 6). As shown in FIG. 7, the emission color of the above-described current modulation type multi-color cathode ray tube in accordance with the present invention changes from the chromaticity point A (red) to the chromaticity point B (yellow-green) when the current density of the electron beam increases from 0.1 $\mu A/cm^2$ to 4.0 $\mu A/cm^2$.

In FIG. 7, a chromaticity point C (u=0.2247, v=0.3699) indicates the emission color, at a current density of electron beam of 4.0 $\mu A/cm^2$, of a current modulation type multi-color cathode ray tube made in the same way as the above-described current modulation type multi-color cathode ray tube in accordance with the present invention, except that a $(Y_{0.95},Eu_{0.05})_2O_2S$ red emitting phosphor having the same Eu activator amount and consequently exhibiting the same emission color as those in the aforesaid $(Y_{0.94999},Eu_{0.05},Ce_{0.00001})_2O_2S$ red emitting phosphor is used, instead of this phosphor, as the phosphor exhibiting the sublinear current density-emission luminance relationship. The emission color of the cathode ray tube using this $(Y_{0.95},Eu_{0.05})_2O_2S$ red emitting phosphor at a current density of electron beam of 0.1 $\mu A/cm^2$ is the same as the emission color of the above-described cathode ray tube in accordance with the present invention at the same current density, and is represented by the chromaticity point A. Accordingly, the emission color of this cathode ray tube changes from the chromaticity point A to the chromaticity point C when the current density of the electron beam increases from 0.1 $\mu A/cm^2$ to 4.0 $\mu A/cm^2$.

As is clear from the comparison of the length of the straight line connecting the chromaticity point A with the chromaticity point B with the length of the straight line connecting the chromaticity point A and the chromaticity point C, the range of emission color changing when the current density of the electron beam increases from 0.1 $\mu A/cm^2$ to 4.0 $\mu A/cm^2$ is wider in the cathode ray tube in accordance with the present invention than in the cathode ray tube using the aforesaid $(Y_{0.95},Eu_{0.05})_2O_2S$ red emitting phosphor. The changing range of the emission color is calculated by the formula $\sqrt{\Delta u^2 + \Delta v^2}$. When the current density of the electron beam increases from 0.1 μA/cm² to 4.0 μA/cm², the $\sqrt{\Delta u^2 + \Delta v^2}$ value of the cathode ray tube in accordance with the present invention is 0.195, while the $\sqrt{\Delta u^2 + \Delta v^2}$ value of the cathode ray tube using the $(Y_{0.95},Eu_{0.05})_2O_2S$ phosphor is 0.165.

INDUSTRIAL APPLICABILITY

The phosphor in accordance with the present invention makes it possible to change the emission color and conduct multi-color display by changing the energy of the excitation electron beam. The electron excited fluorescent display device using the phosphor is applicable to multi-color cathode ray tubes in terminal display units of computers, display units of aircraft control system, and the like, and electronic display units such as multi-color electron excited fluorescent display device, and has valuable industrial applicability.

We claim:

1. An electron excited fluorescent display device including a fluorescent screen, and comprising, as the main part of the fluorescent screen, a rare earth yellow to red emitting phosphor represented by the following general formula:

$$(Ln_{1-x-y}Eu_x Ce_y)_2 O_2 S$$

in which Ln is at least one of yttrium, gadolinium, lanthanum and luetetium, x is a number satisfying $10^{-4} \leq x \leq 9 \times 10^{-2}$, and y is a number satisfying $10^{-6} \leq y \leq 2 \times 10^{-3}$, and exhibiting sublinear current density-emission luminance characteristics when current density of an excitation electron beam is increased, said electron excited fluorescent display device being a current modulation type multi-color cathode ray tube provided with at least one current modulation electron gun for changing the current density of the electron beam emitted therefrom, a non-pattern fluorescent screen positioned in an advancing direction of said electron beam so as to stand face to face with said current modulation electron gun, and a deflecting coil or coils for generating a magnetic field in a direction normal to the advancing direction of said electron beam, deflecting said electron beam, and causing the entire surface of said non-pattern fluorescent screen to be excited by said electron beam and to emit light, and said non-pattern fluorescent screen comprising a yellow to red emitting phosphor as defined above exhibiting the sublinear current density-emission luminance characteristics when the current density of said electron beam is increased, and a phosphor exhibiting an emission color different from said yellow to red emitting phosphor and exhibiting superlinear or linear current density-emission luminance characteristics when the current density of said electron beam is increased.

2. An electron excited fluorescent display device as defined in claim 1 wherein y in said general formula is a number satisfying the condition:

$$2 \times 10^{-6} \leq y \leq 10^{-3}.$$

3. An electron excited fluorescent display device as defined in claim 1 wherein x in said general formula is a number satisfying the condition:

$$10^{-2} \leq x \leq 8 \times 10^{-2}.$$

4. An electron excited fluorescent display device as defined in claim 1 wherein said non-pattern fluorescent screen has a dual layer construction comprising a layer constituted by said phosphor exhibiting the sublinear current density-emission luminance characteristics, and a layer constituted by said phosphor exhibiting the superlinear or linear current density-emission luminance characteristics.

5. An electron excited fluorescent display device as defined in claim 4 wherein the layer of said non-pattern fluorescent screen having the dual layer construction nearer to said current modulation electron gun is constituted by said phosphor exhibiting the sublinear current density-emission luminance characteristics.

6. An electron excited fluorescent display device as defined in claim 1 wherein said non-pattern fluorescent screen is of a single layer comprising a phosphor mixture containing said phosphor exhibiting the sublinear current density-emission luminance characteristics and said phosphor exhibiting the superlinear or linear current density-emission luminance characteristics.

7. An electron excited fluorescent display device as defined in claim 6 wherein said phosphor mixture comprises grains of said phosphor exhibiting the sublinear current density-emission luminance characteristics, which are stuck to the surfaces of grains of said superlinear or linear current density-emission luminance characteristics.

8. An electron excited fluorescent display device as defined in claim 1 wherein said phosphor exhibiting the superlinear or linear current density-emission luminance characteristics is a blue to green emitting phosphor.

9. An electron excited fluorescent display device as defined in claim 8 wherein said phosphor exhibiting the superlinear or linear current density-emission luminance characteristics is a silver activated zinc cadmium sulfide blue-green to green emitting phosphor containing at least one metal selected from the group consisting of iron, cobalt, nickel and vanadium and/or a copper and aluminium activated zinc sulfide green emitting phosphor containing at least one metal selected from the group consisting of iron, cobalt and nickel.

* * * * *

UNITED STATES PATENT AND TRADEMARK OFFICE
CERTIFICATE OF CORRECTION

PATENT NO. : 4,510,414

DATED : April 9, 1985

INVENTOR(S) : Sigeo Fujino et al.

It is certified that error appears in the above-identified patent and that said Letters Patent is hereby corrected as shown below:

In the heading of the patent, [73] Assignee:, delete "Fuji Photo Film Co., Ltd., Japan" and insert therefor -- Kasei Optonix, Ltd., Japan -- .

Signed and Sealed this

Twenty-fourth Day of December 1985

[SEAL]

Attest:

DONALD J. QUIGG

Attesting Officer

Commissioner of Patents and Trademarks